United States Patent [19]
Collie

[11] Patent Number: 5,479,906
[45] Date of Patent: Jan. 2, 1996

[54] MULTIPLE PHASE FUEL SUPPLY SYSTEM FOR INTERNAL COMBUSTION ENGINE

[75] Inventor: Curtis B. Collie, Dearborn, Mich.

[73] Assignee: Ford Motor Company, Dearborn, Mich.

[21] Appl. No.: 405,313

[22] Filed: Mar. 16, 1995

[51] Int. Cl.⁶ .................................................. F02M 21/02
[52] U.S. Cl. ........................................ 123/525; 123/304
[58] Field of Search .................................... 123/525, 527, 123/304

[56] References Cited

U.S. PATENT DOCUMENTS

| | | | |
|---|---|---|---|
| 4,370,969 | 2/1983 | Zarelli et al. | 123/525 |
| 4,489,700 | 12/1984 | van der Weide | 123/527 |
| 4,524,730 | 6/1985 | Doell et al. | 123/525 |
| 4,545,356 | 10/1985 | Casey | 123/527 |
| 4,632,083 | 12/1986 | Reggiani | 123/527 |
| 5,010,868 | 4/1991 | Clements | 123/527 |
| 5,033,444 | 7/1991 | Kaufman et al. | 123/527 |
| 5,076,244 | 12/1991 | Donaldson | 123/527 |
| 5,203,305 | 4/1993 | Porter et al. | 123/527 |
| 5,275,145 | 1/1994 | Tuckey | 123/525 |
| 5,291,869 | 3/1994 | Bennett | 123/527 |
| 5,377,645 | 1/1995 | Moore | 123/525 |

*Primary Examiner*—Thomas N. Moulis
*Attorney, Agent, or Firm*—Jerome R. Drouillard; Roger L. May

[57] ABSTRACT

A multiple phase fuel supply system for an internal combustion engine includes a pressurized supply tank for holding liquid hydrocarbon fuel having the characteristic that it is normally a vapor at room temperature and atmospheric pressure. At least one liquid injector receives liquid fuel from the tank and injects the liquid in the intake system of the engine, and at least one vapor injector receives fuel vapor from the tank and injects the vapor into the intake system of the engine. A controller operates the liquid and vapor injector such that at least one operating parameter of the fuel supply tank will be maintained between predetermined limits.

14 Claims, 1 Drawing Sheet

MULTIPLE PHASE FUEL SUPPLY SYSTEM FOR INTERNAL COMBUSTION ENGINE

BACKGROUND OF THE INVENTION

The present invention relates to a fuel system for providing an internal combustion engine with liquified petroleum gas or cryogenically stored natural gas. In either case, fuel is supplied to the engine in both liquid and vapor phases.

DISCLOSURE INFORMATION

Governmental requirements relating to exhaust emissions from vehicles equipped with internal combustion engines have driven automotive engineers to seek alternative fuels. Such fuels now include propane and compressed natural gas. Also, investigatory work is being done with cryogenically stored natural gas. In the case of both cryogenically stored natural gas (hereinafter referred to as "natural gas") and propane, both hydrocarbon fuels are stored as a liquid having a characteristic that is normally a vapor at room temperature and atmospheric pressure. Contemporary automotive fuel injection systems are characterized, at least in the gasoline injection arena, as injecting liquid into the induction system of the engine. It is desirable to inject liquid into the induction system, or at a minimum, to deal with liquid during the fuel metering process, because the density of liquid fuel is much greater than that of vapor. Hence, it is possible to obtain higher energy density for each injection by using liquid fuel. This principle is true not only with gasoline, but also with propane and natural gas. Unfortunately, given the temperature response characteristics of propane and natural gas, it is difficult to keep such fuels liquified in the engine compartment of the vehicle. Of course, during operation of the vehicle, or even during soaking of the vehicle at high ambient temperatures, the temperature of the fuel handling hardware at the engine, and, perhaps the fuel storage tank, will greatly exceed that at which the fuel may be maintained as a liquid, and as a result, it is difficult to maintain liquid fuel in the fuel supply rail at the injectors. For this reason, systems have been constructed with return lines which continually recirculate cooler fuel from the tank of the vehicle up to the fuel rail supplying the injectors and then back to the tank. In turn although this causes the bulk temperature of the fuel to increase because of the absorption heat from the engine, the localized temperature in the fuel rail can be maintained below the temperature at which vaporization occurs at pressures which are workable for automotive type fuel injection equipment. Problems may develop, however, when vehicles are operated for extensive periods of time at high ambient temperatures, such that the temperature within the tank builds steadily. If the temperature is uncontrolled, the pressure within the tank may itself be unstable, and the pressure may build to the point where vapors will be discharged to the atmosphere. This is undesirable because it may cause non-compliance with applicable motor vehicle emission control standards. Furthermore, it goes without saying that the discharge of vapor in the atmosphere is a waste of fuel—itself an undesirable characteristic.

A system according to the present invention provides control of temperature and pressure within the fuel tank without wasting fuel, while providing a means for starting the vehicle equipped with a propane or natural gas liquid injection system. Of course, when a vehicle is soaked at a high temperature, all of the fuel within the rail will likely be vaporized and this will cause difficulty upon starting if the liquid injectors are employed for furnishing startup fuel. According to the present invention, a vapor injector will be used for starting and also as a means for introducing vapor fuel into the engine during normal operation of the engine so as to control the temperature and pressure within the fuel supply tank. It is an advantage of the present invention that the system offers superior high ambient and post-shutdown starting characteristics, while avoiding the need to vent fuel to the atmosphere as a result of operation for extended periods of time at high ambient temperatures.

Other advantages of the present invention will become apparent to the reader of this specification.

SUMMARY OF THE INVENTION

A multiple phase fuel supply system for an internal combustion engine includes a pressurized supply tank for holding liquid hydrocarbon fuel, with the fuel having the characteristic that it is normally a vapor at room temperature and atmospheric pressure. At least one liquid injector receives liquid fuel from the tank and injects the liquid into the intake system of the engine. At least one vapor injector receives fuel vapor from the tank and injects the vapor into the intake system of the engine. A controller operates the liquid and vapor injectors such that at least one operating parameter of the supply tank will be maintained between predetermined limits. This operating parameter may include fuel tank temperature and/or fuel tank pressure. Liquid fuel is recirculated between the supply tank and the at least one liquid injector. The controller operates the liquid injector and the vapor injector during starting of the engine such that a substantial part of the engine's fuel requirement is furnished by fuel passing through the vapor injector when the temperature of at least a portion of the fuel system is greater than a predetermined level during engine start-up. According to yet another aspect of the present invention, a fuel system includes not only the previously described injectors, but also a fuel supply line and supply pump for circulating liquid fuel to the liquid injectors and a return line for returning fuel from liquid injectors to the supply tank.

According to yet another aspect of the present invention, a method for operating a multiple phase fuel supply system for an internal combustion engine, wherein the system is capable of furnishing fuel which is normally a vapor at room temperature and atmospheric pressure in both liquid and vaporous phases to the engine includes the steps of: sensing a plurality of engine and fuel system operating parameters; determining the total fuel requirement of the engine; determining the phase fraction of the total fuel requirement to be furnished to the engine in each of the phases, with the phase fractions being determined by comparing at least one of the sensed parameters with a predetermined range of the sensed parameter, and finally, furnishing fuel to the engine according to the predetermined phase fractions.

DETAILED DESCRIPTION OF THE PREFERRED EMBODIMENTS

Figure 1:
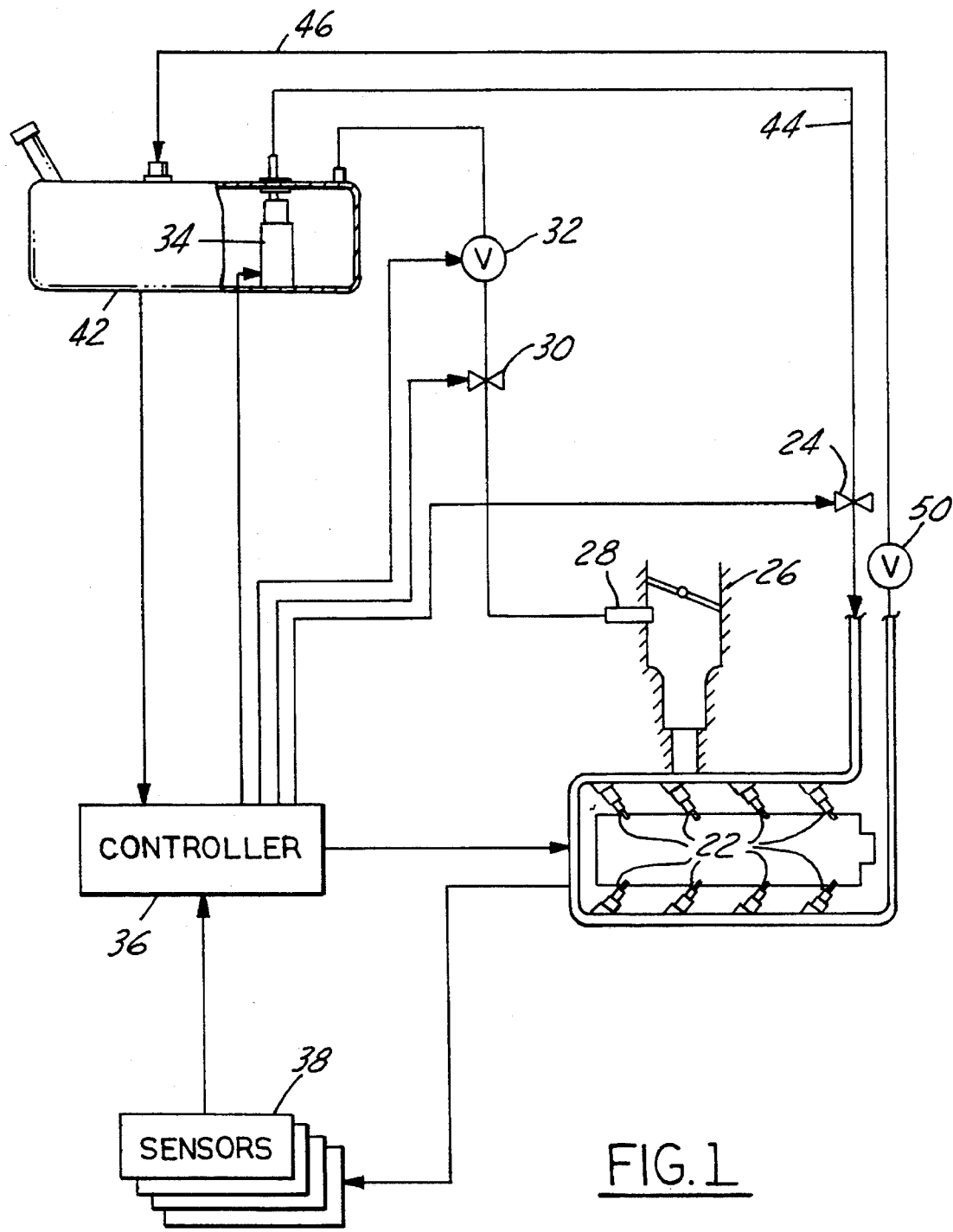
FIG. 1 is a schematic representation of a system according to the present invention.

As shown in FIG. 1, engine 20 has a plurality of liquid injectors 22 and a single vapor injector 28. Those skilled in the art will appreciate in view of this disclosure that liquid injectors 22 could supply fuel not only to the intake manifold of the system but also directly into the engine's cylinders. Liquid injectors 22 receive fuel from fuel supply tank 42 by means of liquid fuel pump 34, which is mounted within tank 42, and which supplies fuel through fuel supply line 44. Liquid fuel cutoff 24, which is operated by controller 36, allows liquid fuel to flow to injectors 22, all of which are operated by controller 36. Injectors 22 are preferably of the bottom feed type, in order to better handle the fuel vapor which would be expected to be generated during certain operating conditions. Upon flowing through liquid cutoff 24, fuel enters liquid fuel supply rail 48, and after some of the fuel is evacuated by liquid injectors 22, the balance of the fuel returns to fuel supply tank 42 by means of fuel return line 46. The liquid fuel passes through pressure regulator 25 prior to entering fuel return line 46. Pressure regulator 25 is employed to govern the pressure of liquid fuel within fuel supply rail 48. Pressure within fuel supply rail 48 may be further controlled by controller 36, which may be used to operate liquid fuel pump 34 at variable speeds corresponding to a desired output pressure.

Recirculation of liquid fuel to and from the engine and fuel in this manner, serves to maintain the temperature within liquid fuel supply rail 48 between predetermined limits so as to avoid the problem of fuel vaporizing within liquid fuel supply rail 48.

In the event that engine 20 is started under high ambient temperature conditions after the vehicle has been allowed to soak for a sufficient period of time such that the fuel has vaporized in liquid fuel supply rail 48, controller 36 will command liquid fuel cutoff 24 to close, either partly or completely, and fuel will be supplied via vapor pressure regulator 32 and vapor fuel cutoff 30 to vapor injector 28, which discharges vapor into throttle body 26. The vaporized fuel is drawn through throttle body 26 by the air entering therethrough and passing into the engine's cylinders. Thus, if the temperature of liquid fuel supply rail 48 is greater than a predetermined level at start-up, so as to indicate that vapor is within liquid fuel supply rail 48, the engine may be started with vapor drawn from fuel tank 42 and passed to vapor injector 28. Alternatively, liquid fuel cutoff 24 may be fully opened, so as to allow liquid fuel pump 34 to circulate liquid fuel from fuel supply tank 42 through fuel supply line 44 and fuel supply rail 48, and then through fuel return line 46 and back to tank 42, so as to fill fuel supply rail 48 with liquid fuel suitable for injection by injectors 22. This procedure may also be used when the engine is idling at high temperatures.

During operation of the vehicle having a multiple phase fuel system according to the present invention, controller 36 will monitor the temperature and pressure within fuel supply tank 42, by means of one or more of sensors 38. In the event that either temperature or pressure, or both are greater than predetermined prescribed levels, or, for that matter, outside a predetermined range, controller 36 will command vapor injector 28 to furnish at least some of the engine's fuel requirement so as to dispose of the excess vapor, while lowering the temperature of the fuel within fuel supply tank 42. In essence, controller 36 determines the total fuel supply requirement of the engine in line with conventional engine control strategies which are known to those skilled in the art and suggested by this disclosure. For example, controller 36 determines how many pounds or kilograms of fuel per hour are required by the engine, and then apportions the phase fraction of the total mass requirement which should be furnished through vapor injector 28 and liquid injectors 22 so that the total mass fuel flow requirement of the engine is met. In the event that fuel tank pressure and/or temperature either exceeds, or is close to exceeding predetermined levels, relatively more, if not all the fuel, will be furnished to the engine through vapor pressure regulator 32, vapor fuel cutoff 30, and vapor injector 28. In this manner, the temperature and pressure of the fuel remaining in the tank will be controlled. Controller 36 uses a plurality of sensors 38, some of which have been alluded to previously in this specification. For example, controller 38 may sense engine operating temperature, fuel tank operating temperature, fuel tank pressure, engine speed, engine load, engine spark timing, engine intake manifold absolute pressure, engine spark advance, EGR rate, and other engine and fuel system operating parameters, so as to determine the total engine fuel requirement. Those skilled in the art will appreciate in view of this disclosure that engine temperature may be measured either at liquid fuel supply rail 48, or at the coolant jacket, or at the radiator, or at any other appropriate position.

Those skilled in the art will appreciate that changes and modifications may be made to the invention described herein while nevertheless coming under the scope of the following claims. For example, pressure regulator 50 may be added in fuel return line 46, so as to allow the pressure within liquid fuel supply rail 48 to be more precisely controlled. Precise governing of such pressure will aid in the process of keeping liquid, vapor-free fuel within fuel supply rail 48.

I claim:

1. A multiple phase fuel supply system for an internal combustion engine, comprising:

a pressurized supply tank for holding liquid hydrocarbon fuel, with said fuel having the characteristic that it is normally a vapor at room temperature and atmospheric pressure;

at least one liquid injector for receiving liquid fuel from the tank and for injecting the liquid into the intake system of the engine;

at least one vapor injector for receiving fuel vapor from the tank and for injecting the vapor into the intake system of the engine; and a controller for operating the liquid injector and the vapor injector such that at least one operating parameter of the supply tank will be maintained between predetermined limits.

2. A fuel supply system according to claim 1, wherein liquid fuel is recirculated between said supply tank and said liquid injector.

3. A fuel supply system according to claim 1, wherein said controller operates said liquid injector and said vapor injector during starting of the engine such that a substantial part of the engine's fuel requirement is provided by fuel passing through said vapor injector when the temperature of at least a portion of the fuel system is greater than a predetermined level during engine start-up.

4. A fuel supply system according to claim 1, wherein said controller operates said liquid injector and said vapor injector such that as temperature builds within the fuel supply tank during operation of the engine, sufficient vapor will be supplied to the engine through the vapor injector so as to maintain the temperature of the liquid within the tank below a predetermined level.

5. A fuel supply system according to claim 1, wherein said controller operates said liquid injector and said vapor injector such that sufficient vapor is withdrawn from the supply tank during operation of the engine so that the pressure within the tank is maintained below a predetermined level.

6. A fuel supply system according to claim 1, wherein said fuel comprises propane.

7. A fuel supply system according to claim 1, wherein said fuel comprises natural gas.

8. A multiple phase fuel supply system for an internal combustion engine, comprising:

a pressurized supply tank for holding liquid hydrocarbon fuel, with said fuel having the characteristic that it is normally a vapor at room temperature and atmospheric pressure;

a plurality of liquid injectors for injecting liquid fuel into the intake system of the engine;

a fuel supply line and supply pump for circulating liquid fuel to said liquid injectors;

a fuel return line for returning fuel from said liquid injectors to said supply tank;

at least one vapor injector for receiving vapor from the fuel supply line and for injecting the vapor into the intake system of the engine; and a controller for operating the liquid injector, the vapor injector, and the fuel supply pump such that at least one operating parameter of the fuel supply system will be maintained within predetermined limits.

9. A fuel supply system according to claim 8, wherein said controller operates said liquid injector, said vapor injector and said pump during starting of the engine such that at least a substantial part of the engine's fuel is provided by said vapor injector when the temperature of at least a portion of the fuel system is greater than a predetermined level.

10. A fuel supply system according to claim 8, wherein said controller operates said liquid injector, said vapor injector, and said pump such that as temperature builds within the fuel supply tank during operation of the engine, sufficient vapor will be supplied to the engine through the vapor injector so as to maintain the temperature of the liquid within the tank below a predetermined level.

11. A fuel supply system according to claim 8, wherein said controller operates said liquid injector, said vapor injector, and said pump such that sufficient vapor is withdrawn from the supply tank during operation of the engine that the pressure within the tank is maintained below a predetermined level.

12. A fuel supply system according to claim 8, wherein said controller operates said liquid injectors and said vapor injector and said fuel supply pump during starting of the engine such that liquid fuel is circulated from said supply tank and through said fuel supply line and said fuel return line in order to purge vapor from said fuel lines as well as from a fuel supply rail interposed between said fuel supply line and said fuel return line, with the liquid injectors being turned off during such starting, such that all of the engine's fuel requirement is provided by fuel passing through said vapor injector.

13. A fuel supply system according to claim 8, wherein said controller operates said liquid injectors and said vapor injector and said fuel supply pump during running of the engine at temperatures which would vaporize fuel within a fuel supply rail at the engine, such that liquid fuel is circulated from said supply tank and through said fuel supply line and said fuel return line in order to purge vapor from said fuel lines as well as from the fuel supply rail, with the liquid injectors being turned off during such operation, such that all of the engine's fuel requirement is provided by fuel passing through said vapor injector.

14. A method for operating a multiple phase fuel supply system for an internal combustion engine, wherein said system is capable of furnishing fuel which is normally a vapor at room temperature and atmospheric pressure in both liquid and vaporous phases to the engine, comprising the steps of:

sensing a plurality of engine and fuel system operating parameters;

determining the total fuel requirement of the engine;

determining the phase fraction of the total fuel requirement to be furnished to the engine in each of said phases, with said phase fractions being determined by comparing at least one of said sensed parameters with a predetermined range of said at least one parameter; and furnishing fuel to the engine according to the determined phase fractions.

* * * * *